No. 626,555. Patented June 6, 1899.
U. NEHRING.
PHOTOGRAPHIC BURNISHER.
(Application filed Feb. 23, 1899.)
(No Model.)

WITNESSES:
Wm. S. Caywood.
C. P. Alber

INVENTOR.
Ulrich Nehring
BY
E. F. Gennert
HIS ATTORNEY.

THE NORRIS PETERS CO., PHOTO-LITHO., WASHINGTON, D. C.

UNITED STATES PATENT OFFICE.

ULRICH NEHRING, OF NEW YORK, N. Y.

PHOTOGRAPHIC BURNISHER.

SPECIFICATION forming part of Letters Patent No. 626,555, dated June 6, 1899.

Application filed February 23, 1899. Serial No. 706,466. (No model.)

*To all whom it may concern:*

Be it known that I, ULRICH NEHRING, a citizen of the United States, and a resident of New York, in the county of New York and State of New York, have invented a certain new and useful Hand Burnishing-Roller, of which the following is a specification.

My invention relates to an improvement in hand-burnishers for giving a polish to photographs; and it consists in the novel arrangements of its several parts, as will be more fully described.

It has been usual for burnishing-rollers to be mounted on uprights and operated by revolving a crank-handle. These are quite expensive, and few amateur photographers care to avail themselves of their use.

My present invention is a practical inexpensive burnisher intended mainly for this class of photographers, reference being had to the accompanying drawings, forming part of this specification, in which—

Figure 1:
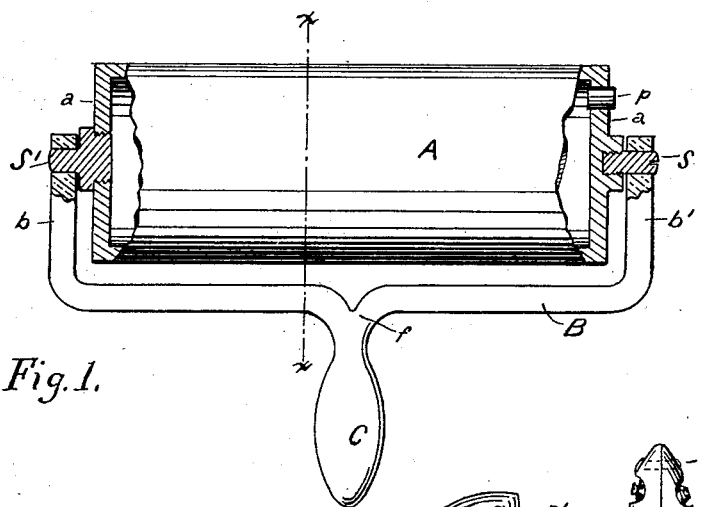
Figure 2:
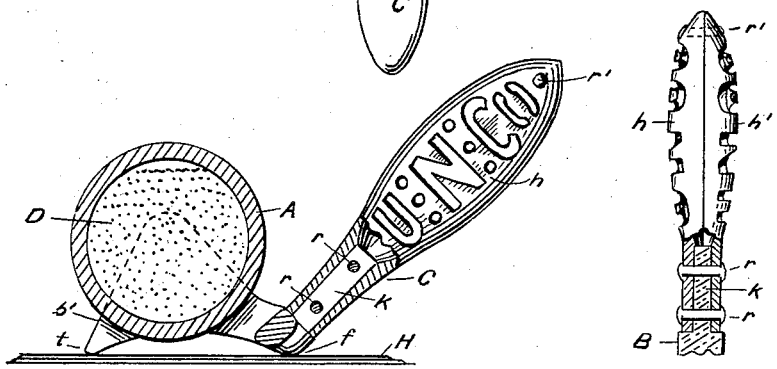
Figure 3:
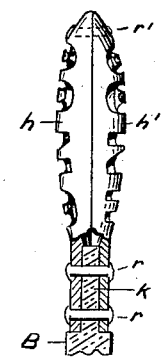
Figure 4:
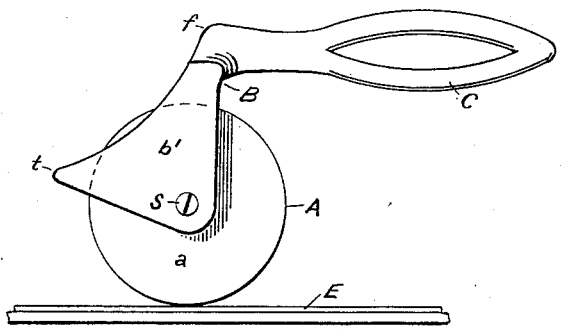

Figure 1 is a plan view of my improved burnisher. Fig. 2 is a sectional view of cylinder and fork on line X X of Fig. 1, the handle being hollow and perforated. Fig. 3 is an edge view of handle shown in Fig. 2. Fig. 4 is an end view of Fig. 1, the frame and handle being cast of one piece.

Similar letters of reference refer to similar parts in the several views.

A is a cylindrical roller, preferably of a non-corrosive metal, such as brass or composition, which is susceptible of a fine polish and is also a ready conductor of heat. This cylinder rotates in a frame B by means of studs or screws S, inserted centrally in each head $a$ of the roller. I show in Fig. 1 in one head a stud-screw S and in the other head a shouldered stud-screw plug S'. If two screws like S are used as axles, one in each head, then I use a plug $p$ to close a hole in the head opening into the roller, through which it can be filled or emptied, as will be more fully hereinafter described. When only one screw like S is used in one head of the roller, then I make use of a shouldered stud-screw plug S', which can be used instead of plug $p$ for the purpose of filling, &c., the stud answering also for an axle.

The frame B, I prefer to make of iron and so shaped that the roller will be held between two tines $b\ b'$, which are drilled for bearings for the screws S and S', the roller revolving freely. These tines are quite thin when viewed edgewise; but a side view, as shown in Figs. 2 and 4, shows said tines shaped like a triangle, the bearings for the stud-screws being near the apex. (See Fig. 2.) The lower edge is concaved, so only the outer point $t$ of the tines will touch a flat surface.

Fig. 2 shows the burnisher inverted. When in this position, it rests only on three points—namely, on the outer point of each tine $t$ and on the center of the frame $f$ at the point where the handle C extends at an angle outward and upward. The purpose of this is that when the roller A is being heated, as on a stove or hot plate H, the roller absorbs the heat, and as the frame rests only on three points it will be but slightly heated. It will be noticed that the roller is so mounted in the frame that when in the position shown in Fig. 2 the polished burnishing-surface of the roller will not touch the surface on which the frame rests.

The handle C may be made of wood or wire, or it may be cast integral with the tines forming the fork, as shown in Fig. 4. An inexpensive handle is made by casting two halves $h\ h'$ and then securing them together, as shown in Figs. 2 and 3. They are cast thin and perforated for ventilation and are riveted to the frame, the rivets $r$ passing through each half and through the shank $k$, as shown. A rivet $r'$ may be used near end of the handle.

I find in practice that burnishers will retain their heat longer when filled with dry sand, brass filings, sulfur, or any material which retains caloric than when the roller is empty. Hence I provide in one of the heads $a\ a$ small filling-in hole, which is closed by means of a plug $p$ to prevent the contents D from spilling out, or I use a shouldered screw-plug S', as hereinbefore described.

Such being the construction of my improved hand-burnisher, the operation, which is as follows, will be easily understood: The roller may be filled with a caloric-absorbing material D or be empty. When it is desired to burnish photographs, the burnisher is inverted and placed on a hot stove or hot plate H, as shown in Fig. 2. The roller A absorbs the heat. When the roller has the proper temperature, the handle C is seized and the frame held in the position shown in Fig. 4 and rolled over the surface of the print E, and if the photograph has previously been prepared by carefully rubbing dry castile soap or any desired enamel over the surface a high polish will result.

While I prefer the construction shown, I do not limit myself to minor details thereof, as the same may be modified without departing from the principle of my invention.

Having fully described my invention, what I claim as new, and desire to secure by Letters Patent, is—

1. In a burnishing-roller the combination with a handle and a forked frame secured at substantially right angles thereto, said frame being concave on its upper end and provided near its base with bearings; of a hollow roller provided with an opening in one end, a plug in said opening and removable studs secured to the roller and resting in the bearings in the frame, substantially as and for the purpose set forth.

2. In a burnishing-roller the combination with a handle and a forked frame secured at substantially right angles thereto and provided with bearings; of a hollow roller having a screw-threaded opening in one end and removable bearing-studs engaging the roller, one of said studs being adapted to close the opening in the roller, substantially as and for the purpose set forth.

3. In a burnishing-roller the combination with a handle, a frame secured at substantially right angles thereto, two forwardly-extending tines on the frame having concave upper edges, downwardly-projecting triangular bases and bearings near the apex of the triangles; of a hollow metallic roller and removable studs engaging the ends of the roller and resting in the bearings, substantially as and for the purpose set forth.

4. The herein-described burnishing-roller consisting of a handle, a frame secured at substantially right angles thereto, a hollow roller journaled across the frame and a heat-retaining substance in the roller, the point of junction with the handle and the extreme outer points of the frame being higher than the rest of the frame, and somewhat above the periphery of the roller, substantially as and for the purposes set forth.

5. The herein-described burnishing-roller consisting of a handle, a frame secured at an angle thereto and a roller journaled across the frame in such a position that the periphery of the roller stands below the top of the frame and out of contact with the heating-surface when the frame is inverted and placed thereon, substantially as and for the purpose set forth.

Signed at New York, in the county of New York and State of New York, this 21st day of February, A. D. 1899.

ULRICH NEHRING.

Witnesses:
W. S. CAYWOOD,
C. P. ALBEE.